United States Patent [19]

Briccetti et al.

[11] 4,164,763
[45] Aug. 14, 1979

[54] TIME SEQUENCED MULTIPLEXING METHOD OF RECORDING AND TRANSLATING DATA

[75] Inventors: Mario F. Briccetti, Syracuse; Fredrick R. Eplett, Liverpool, both of N.Y.

[73] Assignee: Carrier Corporation, Syracuse, N.Y.

[21] Appl. No.: 854,179

[22] Filed: Nov. 23, 1977

[51] Int. Cl.² .......................... G11B 5/00; G11B 5/09
[52] U.S. Cl. ........................................ 360/32; 360/6; 360/40
[58] Field of Search .......................... 360/6, 32, 40, 18

[56] References Cited

U.S. PATENT DOCUMENTS

| | | | |
|---|---|---|---|
| 3,012,234 | 12/1961 | Burns | 360/6 |
| 3,212,076 | 10/1965 | Guerth | 360/6 |
| 3,333,247 | 7/1967 | Hadley et al. | 360/6 |
| 3,792,445 | 2/1974 | Bucks et al. | 360/6 |
| 3,840,890 | 10/1974 | Sunderland | 360/32 |

FOREIGN PATENT DOCUMENTS 1063779 11/1965 United Kingdom ..................... 340/347

Primary Examiner—Vincent P. Canney
Attorney, Agent, or Firm—J. Raymond Curtin; Robert P. Hayter

[57] ABSTRACT

A method and apparatus for recording and translating data using sequential spacing of data points on a recording medium. Electrical pulses are generated in response to the quantitative level of a series of events to be monitored. These pulses are then applied sequentially from a base reference point to the recording medium. The pulses are applied so that the distance between pulses is indicative of the quantitative level of each monitored event. This method is particularly useful in field instrumentation for monitoring equipment performance, process variables, weather conditions and any other variable events or conditions. Any number of events may be periodically sequentially applied to the medium over a long period of time. The recording medium can then be played back at high speed to translate the information obtained.

18 Claims, 3 Drawing Figures

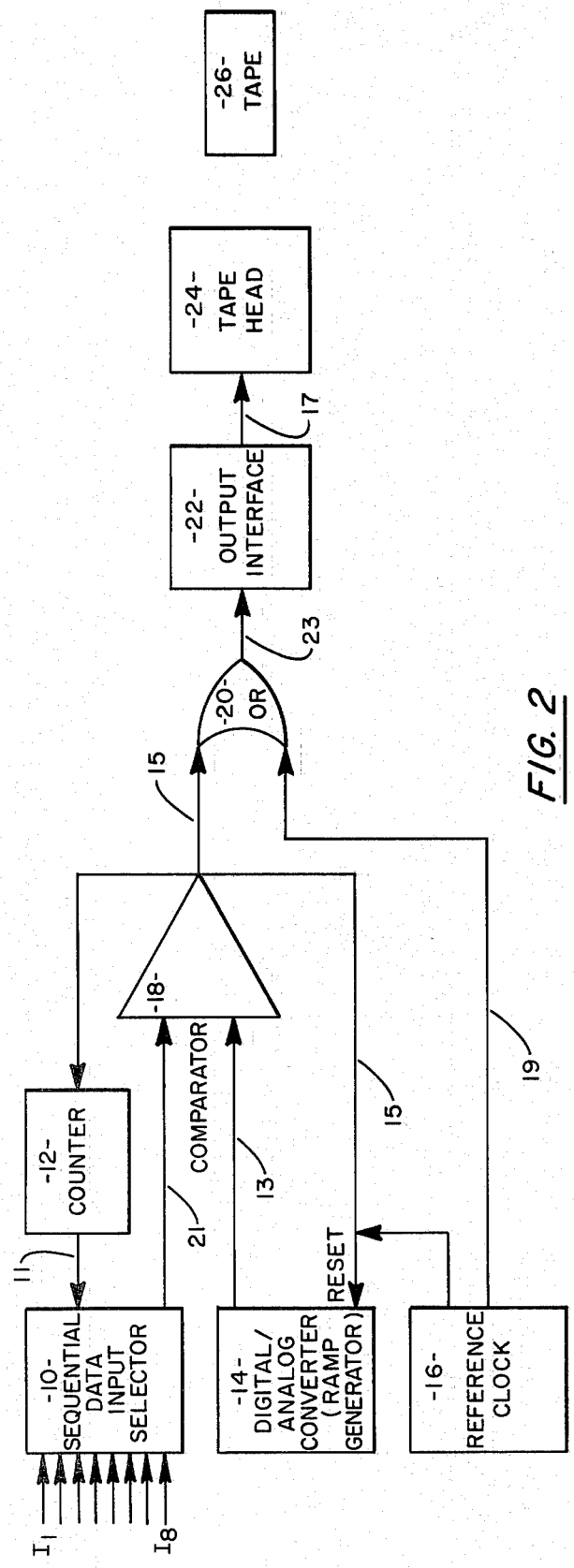
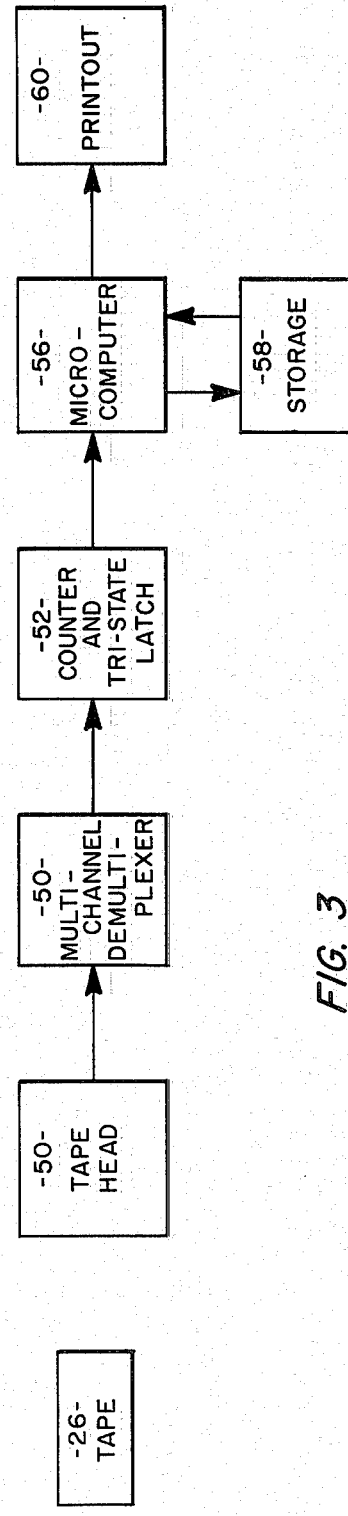
FIG. 2
FIG. 3

TIME SEQUENCED MULTIPLEXING METHOD OF RECORDING AND TRANSLATING DATA

BACKGROUND OF THE INVENTION

1. Field of the Invention

The present invention relates to apparatus and a method of recording and translating data utilizing a recording medium. More particularly the present invention relates to a method of sequentially spacing data points on a recording medium such that the distance between data points is indicative of the quantitative level of each event. This method is particularly useful for field installed monitoring equipment.

2. Description of the Prior Art

Conventionsl monitoring equipment as is presently commercially available is severely limited in the amount of data that can be recorded over a time period. Available equipment using a Westinghouse WR4C recorder is limited to recording three data inputs on a four channel magnetic tape. One channel records time and a single data input is recorded on each of the other three channels. The present invention provides apparatus and a method for sequentially recording multiple data inputs on a single tape channel.

Many applications for monitoring equipment require upwards of 15 to 20 variables be recorded during a monitoring period. Utilizing commercially available equipment, seven separate recorders each having three data inputs would be necessary to monitor all 20 variable. Using multiple recorders necessitates expensive capital expenditures and presents problems with processing and correlating multiple tapes.

A separate patent application entitled "Double Time Sequenced Multiplexing Method of Recording and Translating Data," Ser. No. 854,180, filed simultaneously herewith discloses a method of multiplexing data on a single channel of magnetic tape. Therein the method disclosed requires that the distance between a base point and an event point be determined to ascertain the quantitative level of each event. Furthermore a base clock is used to generate the base point.

The method and apparatus herein does not use a base clock or generate base points. The quantitative level of each event herein is ascertained from the distance on the tape between successive event points. The elimination of the base point allows much more information to be stored on a given length of tape. The elimination of the base point further serves to increase the reliability of the monitoring system since only half as many points need to be applied to the tape and subsequently detected.

The air conditioning and refrigeration industry as part of a continuing effort to improve quality and reliability of equipment has developed testing techniques involving monitoring equipment in the field. With the current awareness for energy conservation it has become particularly important to develop and monitor high efficiency heat pump units.

The various factors which might typically be measured for a heat pump installation include: power to the structure, power to the outdoor fan, power to the compressor, power to the indoor fan, compressor cycles, compressor run time, supplemental resistance heat on time, supplemental resistance heat cycles, defrost cycles, total defrost on time, length of each defrost cycle, time of each defrost cycle, indoor temperature, outdoor temperature, supply air temperature, return air temperature, indoor relative humidity, outdoor relative humidity, supply air flow, system capacity, barometric pressure, wind speed and wind direction.

The method of recording and translating data herein involves multiplexing information sequentially on a single channel of a recorder without the necessity of a separate time channel. Most or all of the above events could periodically be recorded on a single tape channel using the herein described method.

SUMMARY OF THE INVENTION

It is an object of the present invention to provide a method for recording and translating data.

It is a more specific object of the present invention to multiplex multiple data inputs onto a single tape channel.

It is a further object of the present invention to utilize a tape recorder to periodically record events without the necessity of a separate time channel.

It is another object of the present invention to periodically record the quantitative level of a series of events.

It is another object of the present invention to record data such that the distance between data points is indicative of the quantitative level of the event monitored.

It is a further object of the present invention to provide a method of recording and translating data which is economical, reliable and efficient.

Other objects will be apparent from the description to follow and the appended claims.

The preceding objects are achieved according to the preferred embodiment of the invention by sequentially entering the quantitative levels of the events to be monitored on a recording medium. A base reference pulse is entered on the recording medium as a starting point for the entry of subsequent points for the events to be monitored. The fixed interval between successive base reference pulses is the time reference for the data. The quantitative level of the first event to be measured is detected and a magnetic pulse applied to a point on the recording medium a distance from the base reference point. The distance between these points is indicative of the quantitative level of the event. The quantitative level of the second event is then detected and another magnetic pulse applied to the recording medium a distance from the previous point. This distance is indicative of the quantitative level of the second event. Subsequent events are detected and points applied to the recording medium in a like manner. After all the events to be monitored are recorded and after a predetermined interval from the previous base reference pulse another base reference pulse is generated. All of the events are then monitored again. This process continually repeats for the period to be monitored. Eventually the recording medium is translated to indicate the time and quantitative level of each event.

A sequential data input selector is connected to each data input and a counter for indexing the selector between the inputs. A reference clock for periodically generating a pulse is connected to a digital/analog converter which generates a signal which is a function of time and to the counter to indicate the start of the sampling of the events in each series and to reset the digital/analog converter. A comparator compares the levels of the signals from the digital/analog converter and the sequential data input selector. When these signals are equal, the comparator emits a pulse which cycles the counter to the next data input and which resets the digital/analog converter. Pulses from the comparator and the reference clock pass through an "Or" gate to an output interface, to a tape head and are indicated on a recording medium as points, the distance between points indicating the quantitative level of the each event.

BRIEF DESCRIPTION OF THE DRAWINGS

FIG. 2 is a schematic diagram of the system for generating the tape pulses using the data inputs.

FIG. 3 is a schematic diagram of the system for translating the tape pulses to useable information.

DESCRIPTION OF THE PREFERRED EMBODIMENT

Figure 1:
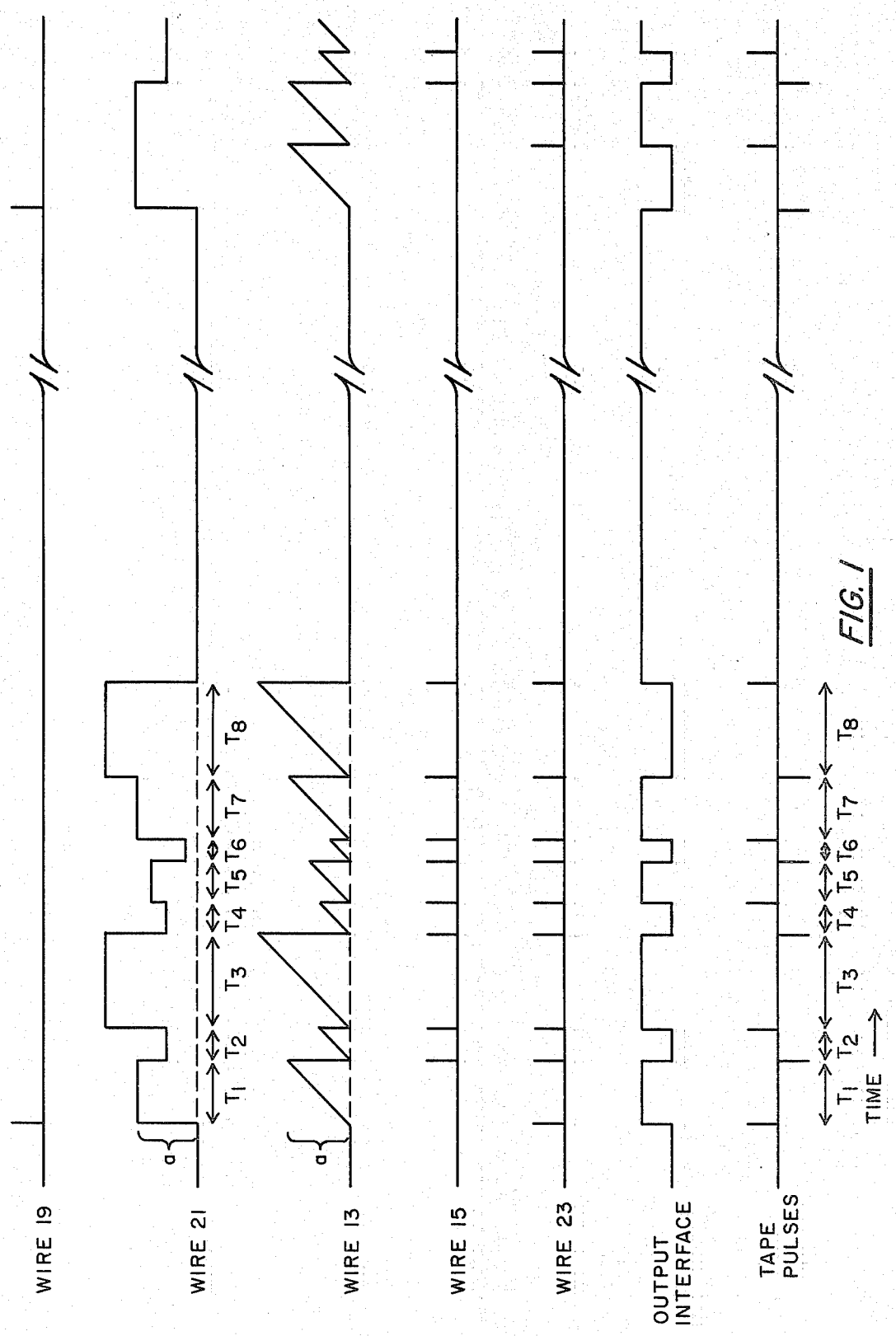
FIG. 1 is a series of pulse and waveform diagrams indicating the method of applying the electric pulse to a recording medium.

The embodiment as herein described could be utilized to monitor air conditioning and refrigeration equipment, however, it is to be understood that this method is applicable to any nature of data monitored.

Referring first to FIG. 2, it can be seen that eight data inputs ($I_1$ through $I_8$) enter sequential data input selector 10 which is connected by wire 11 to counter 12 and by wire 21 to comparator 18. Digital/analog converter 14 which acts as a ramp generator is connected by wires 13 and 15 to comparator 18 and by wire 15 to reference clock 16. "OR" gate 20 is connected by wire 15 to comparator 18, by wire 19 to reference clock 16 and by wire 23 to output interface 22. Wire 17 connects the output interface with tape head 24 which acts on tape 26. Wire 15 also connects comparator 18 to counter 12.

The operation of the system to record the data will be described in conjunction with the various waveform and pulse charts of FIG. 1. Counter 12 acts on sequential data input 10 so that the signal emitted from the sequential data input will sequence in a predetermined order from the various data or event inputs. These data inputs are so designed that the voltage level of the signal is indicative of the quantitative level of that signal. Reference clock 16 generates a periodic signal typically every 2½ minutes which resets the counter which sequences the sequential data input through each separate input and which resets digital/analog converter 14. The pulse generated by the reference clock is indicated on the line denoted by wire 19 in FIG. 1.

Simultaneously with the generation of the reference signal and the commencement of the counter, digital/analog converter 14 begins to generate a signal with constantly increasing voltage relative to time. This ramp signal is commenced from zero each time the counter sequences the data input as well as upon the generation of the reference signal. The line labelled wire 13 in FIG. 1 depicts the ramp signal emitted by digitial/analog converter 14.

Comparator 18 compares the voltage of the signal emitted from the digital/analog converter with the voltage of the signal emitted through wire 21 by the selected data input. When the voltage of both signals is equal, the comparator generates a pulse which indexes the counter through wire 15 to the next data input and which resets the digital/analog converter at zero voltage.

As can be seen in FIG. 1 the line denoted by wire 21 indicates the voltage of the various inputs and the line denoted by wire 13 indicates the voltage generated by the digital/analog converter. When the voltage for the first data input ($I_1$) (indicated voltage level a) equals the voltage of the digital/analog converter (also indicated voltage level a) then the comparator emits a pulse which can be seen on the line denoted by wire 15. Simultaneously the counter is advanced indexing data input selector 10 and the voltage on wire 21 is changed to that of the second input ($I_2$). The digital/analog converter is also cycled by a pulse from comparator 18 through wire 15 and the voltage on wire 13 increases at a given rate until it equals that on wire 21. Then the comparator emits another pulse and recycles the counter and the digital/analog converter. Since the digital/analog converter voltage is a function of time, the distance between successive comparator pulses, assuming a constant tape speed, is then a function of the voltage of the input. Since the input voltage is a function of the quantitative level of the event monitored, there is now a mathematical relationship between the quantitative level of the event and the distance between successive pulses.

"Or" gate 20 emits the pulses of wire 19 and wire 15 as can be seen on the line denoted by wire 23 in FIG. 1. Output interface 22 converts these pulses into the waveform shown on the line denoted output interface in FIG. 1. The line in FIG. 1 designated "Tape Pulses," indicates the positive and negative pulses actually placed on the tape.

From FIG. 1 it can be seen that the time interval of each data input shown on the line denoted by wire 21 is the same as the time interval between successive tape pulses. These time intervals may then be translated into quantitative levels for each event monitored. The tape speed is a known quantity and the order that the inputs are monitored is maintained constant. The reference clock pulses are sufficiently far apart that all of the data inputs are cycled before the next reference pulse starting the entire sequence again. A gap larger than the greatest possible distance between data points may be used to signify the next reference pulse. Other methods of detecting the reference pulse on the tape include placing a distinct or double pulse on the tape to indicate the reference point.

A typical monitoring machine uses a 36 day tape. The frequency of the reference clock is limited only by the capability of the recording medium to discern separate pulses and the distance between points selected to include the desired range of levels for the monitored event. Furthermore the number of inputs may vary from the eight shown depending upon the application requirements.

The system as shown in FIG. 2 is assembled from components well known in the art. Although specific hardware will be listed herein for each block in the system it is to be understood that similar hardware supplied by different manufactures is equally suitable.

Sequential data input selector 10 may be an RCA integrated circuits, Ser. No. CD4051BE. Counter 12 may likewise be an RCA integrated circuit, Ser. No. CD4520BE. Reference clock 14 is a 60Hz clock well known in the art. This clock emits a periodic pulse based on the frequency of the source of current. Digital/analog converter 14 is a combination of two components. An integrated circuit, Ser. No. AD7520JD manufactured by Analog Device Company located at Norwood, Mass., is combined with ¾ of an integrated circuit, Ser. No. IC4136DB, known as a quad operational amplifier. The other quarter of this quad operational amplifier circuit is used as comparator 18. "Or" gate 20 is made from a resistor and two diodes. The diodes may be 1N914's manufactured by Motorola. Output interface 22 is a solid state single pole double throw switch. RCA integrated circuit, Ser. No. CD4013AE may be used for the output interface. Tape head 24 is a conventional tape head as may be found in a Westinghouse W4RC recorder.

The data is recorded on the tape in the field at the site of the equipment being monitored or at a remote location, at a very slow speed typically seven inches per hour. This tape is then transcribed in a high speed machine in a matter of minutes.

FIG. 3 is a schematic diagram of a typical scheme to transcribe the data on the tape. Therein it can be seen that tape 26 is in magnetic relation with tape head 50. The magnetic pulses on the tape read by tape head 50 are converted into separate data channels for each input by multichannel demultiplexer 52. Once the data is arranged by channel it proceeds to counter and tri-state latch 54. Therein the distance between pulses is ascertained. This distance is indicative of the quantitative level of that event. The tri-state latch feeds the quantitative level information to microcomputer 56. The microcomputer stores the information in storage 58 during the time the tape is being read. Thereafter the information is recalled and presented in visual form at printout 60.

As is apparent from the above description, a method has been proveded for sequentially recording the quantitative level of a series of events on a single channel of magnetic tape. The voltage level of each input is converted into a distance on the tape, the distance later being translated into a quantitative level for the event monitored.

In a typical application, sensors to monitor the various events are installed on or about the equipment. These sensors are then connected to a tape recorder at the installation site. The tape recorder has sufficient tape to monitor the events for 36 days. Usually the tape is changed once a month leaving several overlap days should the operator fail to timely remove the recorded tape and install a fresh tape. The tapes after being recorded are sent to a remote transcription site where they are translated into meaningful information. The tapes may then be returned for reuse during subsequent monitoring periods.

For additional description of sequential multiplexing of data onto a recording medium, see United States patent application entitled "Double Time Sequenced Multiplexing Method of Recording and Translating Data," Ser. No. 854,180, filed simultaneously herewith and United States Patent application entitled "Continuous Miltiplexing Method of Recording and Translating Data," Ser. No. 854,181, filed simultaneously herewith.

The above invention has been described in detail with particular reference to a preferred embodiment thereof but it is understood that modifications and variations can be effected within the spirit and scope of the invention.

What is claimed is:

1. A method of recording and translating quantitative data for various events at predetermined periodic intervals over a time period which comprises the steps of:
   (a) detecting the quantitative level of an event;
   (b) creating an electric pulse for the event in response to a time dependent function of the quantitative level of the event and resetting the time dependent function;
   (c) applying the pulse to a recording medium at a point on the medium a distance from a base reference point which distance is indicative of the quantitative level of the event;
   (d) detecting the quantitative level of a different event;
   (e) creating an electric pulse for the different event;
   (f) applying the electric pulse to the recording medium at a point on the medium a distance from the point on the medium created by the previous pulse which distance is indicative of the quantitative level of the different event;
   (g) repeating steps (a) through (f) at predetermined periodic intervals; and
   (h) translating the recording medium to indicate the quantitative level of the monitored events at the predetermined periodic intervals.

2. The method as set forth in claim 1 and further including after step (f) the step of:
   repeating steps (d) through (f) for each event to be recorded by sequentially applying magnetic pulses to the recording medium, the distance between the points created by the pulses indicating the quantitative level of the monitored events.

3. The methes as set forth in claim 1 wherein the step of translating includes:
   ascertaining the location of the base reference point and the points created by the electrical pulses on the recording medium; and
   converting the distance between points into a quantitative level for each event.

4. The method as set forth in claim 1 wherein the steps of applying a pulse to a recording medium include applying a pulse to magnetic recording tape.

5. The method as set forth in claim 1 and further including the steps of:
   generating a periodic base reference pulse;
   applying the base reference pulse to the recording medium at a base reference point to provide a periodic start position for the sequence of distances indicating quantitative levels; and
   translating the base reference point to indicate the start of a sequence.

6. A method of recording quantitative data for selected variables with field instrumentation and subsequently translating the data which comprises the steps of:
   (a) detecting the quantitative level of the variable to be monitored;
   (b) creating an electric pulse in response to a time dependent function of the quantitative level of the variable and resetting the time dependent function simultaneously therewith;
   (c) applying the pulse to a recording medium at a point on the medium a distance from a base reference point which distance is a mathematical function of the quantitative level of the variable;
   (d) detecting the quantitative level of a different variable;
   (e) creating an electric pulse in response to a time dependent function of the quantitative level of the different variable and resetting the time dependent function simultaneously therewith;
   (f) applying the electric pulse to the recording medium medium a distance from the point on the medium created by the previous pulse which distance is a mathematical function of the quantitative level of the different variable;

(g) repeating steps (a) through (f) at predetermined intervals; and (h) translating the recording medium to indicate the quantitative level of the monitored variables at the predetermined intervals.

7. The invention as set forth in claim 6 and further including after step (f) the step of:

repeating steps (d) through (f) for each additional variable to be recorded by sequentially applying electric pulses to the recording medium, the distance between the points created by the electric pulses being a mathematical function of the quantitative level of the monitored events.

8. The invention as set forth in claim 6 wherein the steps of applying a pulse to a recording medium include applying a pulse to magnetic recording tape.

9. The invention as set forth in claim 6 wherein the step of translating includes:

ascertaining the location of the base reference point and the points created in response to the quantitative level of the variables on the recording medium; and converting the distance between points into a quantitative level of each monitored variable for a predetermined interval.

10. Apparatus for recording quantitative data on a recording medium which comprises:

input means for receiving a series of electric signals indicating the quantitative level of each event of a series of events;

signal means for generating an electric signal which is a function of time;

comparator means for generating a pulse when the level of the signal from the input means is equal to the level of the signal from the signal means, said pulse cycling the input means to the next event of the series of events and resetting the signal means; and recorder means for applying the pulse from the comparator means to a recording medium, the distance between successive pulses being indicative of the quantitative level of the event monitored.

11. The apparatus as set forth in claim 10 wherein the input means includes:

a sequential data input selector connector to an input from each event to be monitored; and a counter connected to the sequential data input selector and the comparator means, said counter cycling the sequential data input selector so that the inputs are singly selected in a predetermined sequence, the counter advancing the sequential data selector upon the receipt of a pulse from the comparator means.

12. The invention as set forth in claim 10 wherein the signal means is a digital/analog converter which generates a time dependent signal, said converter being reset to a beginning point upon the receipt of a pulse from the comparator means.

13. The apparatus as set forth in claim 10 wherein the recorder means includes:

an "Or" gate for receiving the pulses from the comparator means;

an output interface connected to the "Or" gate for converting the pulses into a waveform; and a tape head connected to the output interface for converting the waveform into pulses on the recording medium.

14. Apparatus for recording quantitative data on a recording medium which comprises:

input means for receiving a series of electric input signals each indicating the quantitative level of an event in the series;

signal means for generating an electric signal which is a function of time, said signal means being reset upon the application of a pulse;

reference means connected to the signal means for generating a pulse to indicate the start of the sampling of the quantitative level of each event in the series of events and to reset the signal means;

comparator means connected to the input means and the signal means for generating a pulse when the level of the signal emitted from the input means is equal to the level of the signal from the signal means, said pulse cycling the input means to the input corresponding to the next event to be monitored and resetting the signal means; and recorder means for applying the pulses generated by the reference means and the comparator means to a recording medium, the distance between pulses indicating the quantitative level of the event.

15. The apparatus as set forth in claim 14 wherein the input means includes:

a sequential data input selector connected to an input from each event to be monitored; and a counter connected to the sequential data input selector and the comparator means, said counter cycling the sequential data input selector so that the inputs are singly selected in a predetermined sequence, the counter advancing the sequential data selector upon the receipt of a pulse from the comparator means.

16. The invention as set forth in claim 14 wherein the signal means is a digital/analog converter which generates a time dependent signal, said converter being reset to a beginning point upon the receipt of a pulse from the comparator means or the reference means.

17. The apparatus as set forth in claim 14 wherein the recorder means includes:

an "Or" gate for receiving the pulses from the comparator means and the reference means;

an output interface connected to the "Or" gate for converting the pulses into a waveform; and a tape head connected to the output interface for converting the waveform into pulses on the recording medium.

18. The apparatus as set forth in claim 14 wherein the reference means is a reference clock which upon the elapse of a predetermined time period generates a pulse.

* * * * *